United States Patent [19]

Evilampi et al.

[11] 3,981,737

[45] Sept. 21, 1976

[54] PROCESS FOR PRODUCING LIGHTPROOF TITANIUM DIOXIDE PIGMENT

[75] Inventors: Toivo Evilampi; Virpi Laamanen, both of Pori, Finland

[73] Assignee: Kemira Oy, Finland

[22] Filed: Feb. 14, 1974

[21] Appl. No.: 442,409

[30] Foreign Application Priority Data

Feb. 20, 1973 Finland.................................. 493/73

[52] U.S. Cl............................. 106/300; 106/308 B; 427/215
[51] Int. Cl.².......................................... G04B 31/02
[58] Field of Search........................ 106/300, 308 B; 117/100 B; 427/215; 428/328, 329, 379

[56] References Cited
UNITED STATES PATENTS 2,278,540   4/1942   Ellis et al............................ 106/300

Primary Examiner—Winston A. Douglas
Assistant Examiner—John P. Sheehan
Attorney, Agent, or Firm—Bucknam and Archer

[57] ABSTRACT

In the process for manufacturing a light-resisting titanium dioxide pigment suitable for matting artificial fibers, by adding to a suspension of titanium dioxide pigment some water-soluble vanadium compound plus possibly a compound of aluminum, silicon and/or, phosphorus, which are precipitated onto the surface of the titanium dioxide particles, whereafter the suspension is filtered, washed, thermally dried, and ground, the thermal drying and the grinding are carried out at such a low temperature that the pigment temperature at no stage rises above 300°C and for such a short period that the vanadium remains on the surface of the titanium dioxide pigment particles without being substantially calcinated into the particles, which consequently remain white.

10 Claims, No Drawings

PROCESS FOR PRODUCING LIGHTPROOF TITANIUM DIOXIDE PIGMENT

BACKGROUND OF THE INVENTION

The invention relates to a process for manufacturing a light-resisting titanium dioxide pigment suitable for matting artificial fibers; some water-soluble vanadium compound is added to a suspension of titanium dioxide pigment and precipitated on the surface of the titanium dioxide particles, whereafter the suspension is filtered, washed, thermally dried, and ground.

In almost all areas of use, such as paints, plastics, and artificial fibers, a good light-resistance is required of titanium dioxide pigments. Since titanium dioxide per se is somewhat light-sensitive, the $TiO_2$ pigment particles have been protected by covering them with different metal hydroxide coatings. This coating takes place during the manufacture of titanium dioxide pigment at the so-called after-treatment stage, where the said metal compounds are precipitated onto the surface of calcinated pigment crystals dispersed in water. The intended use of the pigment determines which kind of after-treatment is the most advantageous. After the after-treatment the pigment suspension is usually filtered, the soluble salts are washed away from the filter cake, the pure filter cake is dried, and the dried cake is ground.

Often a change in the manufacturing technology which improves the light-resistance of $TiO_2$ pigment in one area of use means an improvement of its light-resistance in other areas of use as well. This is, however, not always the case. Naturally each use sets several other quality requirements for titanium dioxide pigments in addition to light-resistance. At present the manufacturers of $TiO_2$ pigments produce numerous different pigments, each with its own special properties according to its areas of use.

The artificial fiber industry uses mainly the anatase-type titanium dioxide pigment. The use of rutile is, however, increasing to some extent. One of the reasons for the popularity of anatase is that anatase particles are softer than rutile particles, and thus they will not cause as much mechanical wear and tear in the apparatuses of a fiber mill as the harder rutile particles. Anatase is, however, characterized by a very high light-sensitivity if it has not been appropriately after-treated. Neither is the light-resistance of rutile usually sufficient without an after-treatment.

A conventional after-treatment with aluminum oxide hydrate and silicic acid does not give a pigment that is used for artificial fibers a sufficient light-resistance. For this reason, it has been necessary to add to the coating various metal compounds which decrease the light-sensitivity but simultaneously worsen the brightness and tone (whiteness) of the pigment.

Previously known is, for example, a process for manufacturing a titanium dioxide pigment suitable for matting polyamide fibers, a process according to which titanium dioxide pigment is coated with manganese (II) orthophosphate so that the pigment suspended in water is treated with orthophosphoric acid or water-soluble orthophosphate and water soluble manganese (II) salt, whereafter the suspension is neutralized and the obtained pigment is filtered, washed, and dried at a low temperature, 110°C at the most, and ground. The pigment must be dried at a relatively low temperature, for example, in a disperser-drier, to prevent the colorization of the pigment.

Thus, manganese compounds have been quite commonly used earlier. Manganese compounds, however, very strongly affect the tone of white $TiO_2$ pigment. Attempts have been made to decrease this effect by precipitating the manganese into the coating in the form of manganese (II) orthophosphate, but still it has not been possible to eliminate the risk of the manganese oxidizing into strongly coloring compounds at some stage. Therefore the importance of careful drying is emphasized in this previously known process, which naturally complicates the pigment manufacture.

Antimony compounds have also been precipitated into the coating of pigment. Antimony compounds have, however, a reputation of being poisonous materials, which decreases the commercial value of antimony-containing pigments, even though the said risk of poisoning might not exist. A small amount of hydrosulphuric acid in the air causes the antimony hydroxide in the coating to convert into a sulfide and thereby to darken the pigment. Antimony compounds per se have a disadvantageous effect on the brightness of the pigment and the light-resistance is not sufficiently improved when an antimony compound is used alone.

Other metal compounds used for the same purpose are compounds of iron, chromium, cobalt, nickel, and copper; in order to obtain a sufficient light-resistance, however, these compounds must be used in such amounts that the brightness of the pigment is substantially decreased.

From U.S. Pat. application No. 2 062 137 it is also known to add to a titanium dioxide pigment some vanadium compound into a mixture, which is then calcinated at 800°C minimum. When calcinated, the titanium dioxide and the vanadium compound form colorful oxides or titanates. By this process it is not possible to manufacture white titanium dioxide pigments but the end result is always a pigment which is grey or of some other color.

The object of the present invention is therefore to provide a process for manufacturing a light-resisting titanium dioxide pigment usable for matting artificial fibers, a pigment with a great brightness or whiteness.

SUMMARY OF THE INVENTION

According to the invention this object is achieved by preventing the vanadium from being substantially calcined into the titanium dioxide pigment particles during the thermal drying and grinding. In practice this is carried out by holding the temperature of the particles at 300°C or less and only for a period required for fixing the vanadium precipitation on the surface of the particles.

DESCRIPTION OF THE PREFERRED EMBODIMENTS

The most advantageous overall result is obtained when the coating of the pigment contains, in addition to a vanadium compound, compounds of aluminum and silicon. Considering the brightness of the pigment it may in some cases be advisable to add a small amount of phosphate.

The greatest advantage of pigment manufactured according to the invention in comparison with previous pigments is its very good light-resistance. Vanadium compounds tend to somewhat worsen the brightness of the pigment, but this tendency of these compounds is less than that of manganese compounds. The use of vanadium compounds in the after-treatment does not cause any changes in the normal pigment drying and grinding process. Neither is the pigment colorized under the effect of hydrosulfuric acid as are many antimony-containing pigments.

An addition of a phosphate is possible but not at all necessary in the after-treatment process according to the invention. An addition of a phosphate, which has been used in many previous processes, has a disadvantage in that after the treatment it is very difficult to wash all the produced water-soluble salts away from the pigment.

A suitable quantity of a vanadium compound in the coating in terms of light-resistance and brightness is 0.01–0.5 percent of the weight of the pigment, calculated as $V_2O_5$. The most advantageous quantities are within 0.05–0.2 percent, calculated as $V_2O_5$. A vanadium solution suitable for the after-treatment is obtained from, for example, ammonium metavanadate, $NH_4VO_3$. The vanadium-bearing solution is preferably added to an acidic $TiO_2$ suspension.

The quantity of an aluminum compound in the coating of the pigment is 0.5–5 percent of the weight of the pigment, calculated as $Al_2O_3$. The most advantageous quantity is within $Al_2O_3$ 1–3 percent. The aluminum compound can be precipitated into the coating by any previously known method. An advantageous treatment solution is obtained from aluminum sulfate, but other aluminum salt solutions are also suitable. Aluminate solutions can also be used.

The quantity of a silicon compound precipitated into the coating is 0.2–3 percent of the weight of the pigment, calculated as $SiO_2$. The most advantageous quantity is $SiO_2$ 0.5–1.5 percent. The most suitable raw materials for the treatment solutions are different sodium silicates. Other silicates can also be used.

An addition of a phosphate to the coating is necessary only when a very high degree of whiteness is required of the pigment. When necessary, such a phosphate addition is within 0.1–2 percent of the weight of the pigment, calculated as $P_2O_5$. The added phosphate is preferably a water-soluble phosphate, e.g., ammonium dihydrogen phosphate, $NH_4H_2PO_4$. Sodium phosphate can also be added if a neutralization takes place during the after-treatment, in which case the phosphate addition simultaneously neutralizes the solution.

At no stage of the process must the pigment temperature rise too high, e.g., above approximately 300°C. The highest allowed temperature, however, also depends on the duration of the thermal treatment. In the laboratory, the pigments were dried for about 17 hours at 105°C, but on an industrial scale the treatment period is advantageously shorter, about ½ – 2 hours and the drying temperature is about 150°–170°C at the most. The pigment may also be spray ground by means of superheated water vapor the temperature of which is about 250°–300°C, e.g. 270°C. Since the steam expands in the mill and some heat becomes bound to the pigments, the temperature of the latter will not, however, rise more than to about 170°–200°C. The drying rate of the pigment is totally sufficient at these temperatures. When manganese(II) compounds were used, it was not possible to use temperatures higher than about 100°C, which naturally slowed down the drying or, if a vacuum was used, made the drying process complicated and expensive.

A precise determination of the thermal treatment period is, however, difficult. The only practical criterion is that pigment must not be heated so much that is darkens. The time and the temperature are naturally inter-balanced so that when the period is short the temperature may be somewhat higher. The question is also complicated by the fact that at the drying and grinding stages the pigment powder mixes with gas flows much hotter than itself without having the time to reach the temperature of the gas. In the belt dryer used, the maximum temperature of the hot air flowing inside the furnace was somewhere within the range 140°–160°C. When a water-bearing filter cake passes through this dryer, the water evaporates and it is natural that the temperature of the cake does not rise above the boiling point of water. At the very final stage of the drying, when there is not much water left to be dried, the pigment temperature may rise somewhat above 100°C. The delay period of the pigment mass in this dryer is about 40 min. When a spray drier is used, the water suspension of pigment, separated into drops, is mixed with a gas at a temperature of some 500°–600°C. The temperature of the gas and pigment emerging from the dryer, is, however, somewhere within the range 80°–100°C. In a spray mill, the dry pigment is mixed with a water vapor at a temperature of about 270°–300°C, but the temperature of the pigment emerging from the mill is probably 150°–180°C maximum, and the pigment cools immediately upon emerging from the mill. The delay periods in the spray drier and the spray mill are naturally very short, but they are not known precisely.

The invention is described below in more detail with reference to the enclosed examples:

EXAMPLE 1

A calcinated anatase titanium dioxide pigment was dryground and dispersed in water and the water dispersion was classified. The density of the classified dispersion was adjusted to 220 g/l.

The dispersion was heated to 50°C. Waterglass solution in an amount of 1 percent of the amount of $TiO_2$ in the dispersion, calculated as $SiO_2$, was added. This addition raised the pH of the dispersion to about 10. Aluminum sulfate solution in an amount of 2 percent, calculated as $Al_2O_3$, was added in the course of 15 minutes. During this addition the pH of the dispersion decreased to 2.0. Vanadyl sulfate solution in an amount corresponding to $V_2O_5$ 0.15 percent was added. The dispersion was neutralized with a sodium carbonate solution to pH 8.5. After the neutralization the dispersion was mixed at 50°C for 30 minutes. It was filtered and the filter cake was washed with water from which salts had been removed by ion exchange. The pigment was dried and ground in a steam spray mill.

EXAMPLE 2

Pigment was made as in Example 1, but without the addition of a vanadium compound. (Reference sample).

The brightness and tone of the pigment were evaluated by pressing the pigment powder into an even-surfaced briquet and by measuring the reflectance of the briquet surface with an ELREPHO remission photometer (Lichtelectrisches Remissionsphotometer ELREPHO, Carl Zeiss, Oberkochen Wurtt.). The numerical value measured by the color measuring filter Y of the said apparatus was used as the numerical value of brightness. The expression 100 (X-Z)/Y calculated from the values measured by filters X, Y, and Z was used as the color index illustrating the color tone of the pigment.

The light-sensitivity was measured by the following test:

A paste was prepared from 0.5 g of the pigment to be examined, 2.5 g of $PbCO_3$, and 0.75 ml of glycerol. The paste was spread on a glass plate and then half of the paste was covered. The paste was exposed under an UV lamp and the degree of darkening was evaluated visually. The degree of darkening was expressed by numbers 0–6; 0 indicated that light has no effect on the paste color and 6 that the paste had darkened very badly. The standards used in evaluating were photographic papers exposed for different periods of time.

The following results were obtained by these evaluation methods from pigments mentioned in Examples 1 (process according to the invention) and 2 (reference sample):

| | Example 1 | Example 2 |
|---|---|---|
| Pigment brightness (MgO = 100), Y value | 97.28 | 97.89 |
| Color Index (specified above), Ci | 1.51 | 0.82 |
| Degree of darkening in 3.5 hr | 0 | 4 |
| Degree of darkening in 19.5 hr | 1 | 6 |

The after-treatment according to the invention thus eliminated the light-sensitivity of titanium dioxide pigment almost completely. On the other hand, the brightness was somewhat poorer, but this worsening was substantially less than that caused by, for example, manganese compounds, and such a small change has usually no importance in the artificial fiber industry. When so desired, the brightness can be improved with a small phosphate addition.

The determination of whiteness is best carried out by the Elrepho measurements described above. The brightness (K) of commercial $TiO_2$ pigments was usually within the range 5–12. Some values appeared even outside this range. There is an exact correlation between the brightness scale and the Y value measured by Elrepho:

$$K = 319.18 - 3.18Y$$

This equation was obtained experimentally and it is dependent on the standards selected.

Hence it follows that a good brightness means a high Y value and a low K value.

The color index Ci indicates the deviation of the color towards red (positive values) or blue (negative values) when compared to the magnesium oxide used as a standard. In visual evaluation, pigment usually seems brown when the color index is high and grey when the color index is negative. Nevertheless, other colors also have an effect on the color index.

The standards of visual evaluation used in the lead carbonate test were grey-toned photographic papers exposed for different periods of time. The Y values were measured with Elrepho from these standard sheets and the following rounded scale was thereby obtained:

| Degree of darkness in Pb carbonate test | Y value measured with Elrepho |
|---|---|
| 0 | 84 |
| 1 | 80 |
| 2 | 74 |
| 3 | 64 |
| 4 | 52 |
| 5 | 40 |
| 6 | 28 |

The pigments manufactured according to Examples 1 and 2 were also tested by the so-called amygnalic acid test. This test is very widely known and has been described in publication Ind. Eng. Chem. 41, 523–6 (1949), for example.

The pastes were exposed for different periods of time to the light of an UV lamp, and the Y values were measured with Elrepho. The amygnalic acid tests gave the following results:

| Example | $V_2O_5$ | Initial value | 75 sec. | 1 hr | 2 hr | 3 hr |
|---|---|---|---|---|---|---|
| 1 | 0.15% | 67.27 | 67.04 | 67.04 | 66.72 | 66.50 |
| 2 | — | 67.65 | 67.35 | 64.19 | 62.27 | 62.23 |

EXAMPLE 3

Additions to the pigment coating at the after-treatment stage according to the present invention.

SiO 1 percent and $Al_2O_3$ 2 percent were precipitated as anatase pigment coating according to Example 1 and the varying quantities of $V_2O_5$ given in the following table. After the treatment the pigment was washed free of soluble salts and dried for 17 hours at 105°C. Finally the pigment was ground in a steam spray mill by using steam superheated to 300°C.

| $V_2O_5$ % by weight | Brightness measurements with Elrepho | | | | Brightness |
|---|---|---|---|---|---|
| | X | Y | Z | 100Ci | K |
| — | 98.17 | 98.08 | 97.43 | 0.75 | 7.3 |
| 0.01 | 98.10 | 98.00 | 97.23 | 0.89 | 7.5 |
| 0.05 | 97.92 | 97.77 | 96.90 | 1.04 | 8.3 |
| 0.15 | 97.44 | 97.27 | 96.07 | 1.41 | 9.9 |
| 0.50 | 95.43 | 94.94 | 92.78 | 2.79 | 17.3 |

EXAMPLE 4

Additions to titanium oxyhydrate before calcination stage (reference).

A. ANATASE

After additions, all pigments were calcinated for 2 hours 30 minutes at 950°C. At this temperature the pigments obtained a crystal size of 0.15–0.17 microns which is appropriate in terms of covering ability.

| $V_2O_5$ % by weight | Brightness measurements with Elrepho | | | | Brightness |
|---|---|---|---|---|---|
| | X | Y | Z | 100Ci | K |
| — | 97.21 | 97.40 | 97.52 | −0.32 | 9.5 |
| 0.01 | 94.48 | 94.59 | 94.76 | −0.30 | 18.4 |
| 0.05 | 89.67 | 89.46 | 88.68 | 1.11 | 34.7 |
| 0.15 | 84.65 | 83.77 | 80.51 | 4.94 | 52.8 |

-continued

| $V_2O_5$ % by weight | Brightness measurements with Elrepho Brightness | | | | |
|---|---|---|---|---|---|
| | X | Y | Z | 100Ci | K |
| 0.50 | 73.74 | 71.08 | 62.82 | 15.36 | 93.2 |

B. RUTILE

After additions, all pigments were calcinated for 2 hours 30 minutes at 880°C. An appropriate rutile content, 97–99 percent, was obtained at this temperature.

| $V_2O_5$ % by weight | Brightness measurements with Elrepho Brightness | | | | |
|---|---|---|---|---|---|
| | X | Y | Z | 100Ci | K |
| — | 98.03 | 97.82 | 96.47 | 1.59 | 8.1 |
| 0.01 | 96.35 | 95.63 | 92.83 | 3.68 | 15.1 |
| 0.05 | 93.50 | 91.81 | 85.07 | 9.18 | 27.2 |
| 0.15 | 89.37 | 86.60 | 76.04 | 15.39 | 43.8 |
| 0.50 | 80.13 | 75.50 | 59.67 | 27.10 | 79.1 |

Example 4 clearly indicates that high temperature strongly decrease the pigment brightness when a titanium dioxide containing a vanadium compound is calcinated; then the vanadium compound penetrates into the $TiO_2$ crystals.

EXAMPLE 5

Effect of vanadium which has been added to pigment at different stages of the manufacturing process on the light-sensitivity as shown in a lead carbonate test.

The lead carbonate test is described above after Example 2. The UV radiation used for exposure was now, however, stronger. $PbCO_3$ was used in the lead carbonte test described above. In the tests described below, we used an alkaline lead carbonate, 2 $PbCO_3$ . $Pb(OH)_2$, which gives more vigorous reactions.

The additions were made to pigment coating at the after-treatment stage according to the present invention.

Same pigment samples as in Example 3.

| $V_2O_5$ | Evaluation after different UV exposure periods | | | |
|---|---|---|---|---|
| | 15 min. | 30 min. | 60 min. | 90 min. |
| — | 2.5 | 3.5 | 4 | 5 |
| 0.01 % | 2.5 | 3.5 | 4 | 4.5 |
| 0.05 % | 2 | 2.5 | 3 | 3.5 |
| 0.15 % | 1 | 2 | 2.5 | 3 |
| 0.50 % | 0.5 | 0.5 | 0.5 | 1 |

EXAMPLE 6

Additions to titanium oxyhydrate before calcination.
a. Same pigment samples as in Example 4a.

| $V_2O_5$ | Evaluation after different UV exposure periods | | | |
|---|---|---|---|---|
| | 15 min. | 30 min. | 60 min. | 90 min. |
| — | black | black | black | black |
| 0.01 % | black | black | black | black |
| 0.05 % | 5 | 6 | black | black |
| 0.15 % | 1 | 2 | 3 | 3.5 |
| 0.50 % | 0 | 0.5 | 0.5 | 1 | b. Same pigment samples as in Example 4b.

| $V_2O_5$ | Evaluation after different UV exposure periods | | | |
|---|---|---|---|---|
| | 15 min. | 30 min. | 60 min. | 90 min. |
| — | black | black | black | black |
| 0.01 % | black | black | black | black |
| 0.05 % | 2 | 5 | 5.5 | 6 |
| 0.15 % | 0 | 1 | 1.5 | 2 |
| 0.50 % | 0 | 1 | 0.5 | 0.5 |

EXAMPLE 7

Effect of drying temperature on brightness, tone, and light resistance, when vanadium is present in the coating.

An after-treated anatase, its coating containing $V_2O_5$ 0.15 percent, was manufactured according to Example 1. The samples were dried for 1 hour at different temperature.

Effect on brightness (K and Y) and color tone (100Ci)

| Drying temperature | Brightness measurements with Elrepho Brightness | | | | |
|---|---|---|---|---|---|
| | X | Y | Z | 100Ci | K |
| 150°C | 97.28 | 97.00 | 95.64 | 1.69 | 10.7 |
| 600°C | 97.84 | 97.21 | 94.52 | 3.42 | 10.1 |
| 700°C | 98.00 | 97.16 | 92.73 | 5.42 | 10.2 |
| 800°C | 97.20 | 95.57 | 87.52 | 10.13 | 15.3 |

This indicates that the brightness decreases abruptly at 800°C, when vanadium penetrates into the $TiO_2$ crystals.

When the thermally treated samples were examined by the lead carbonate test, it was noted that the thermal treatment had had no effect on the pigment light-resistance in the lead carbonate test.

What is claimed is:

1. In a process for producing a substantially light-proof titanium dioxide pigment suitable for matting artificial fibers, in which a water soluble vanadium compound which is a vanadate or vanadyl salt is added to an aqueous suspension of the titanium dioxide pigment to form a precipitate of a vanadium hydroxide in the amount of 0.01–0.5 percent of the weight of the pigment calculated as $V_2O_5$ on the surface of the titanium dioxide particles, whereafter the suspension is filtered, washed, and the washed precipitate is thermally dried, and ground, the improvement comprising adding to said aqueous suspension an aluminum compound, which is an aluminate or aluminum salt so as to cause a precipitate of a vanadium hydroxide and an aluminum hydroxide on said titanium dioxide particles, the amount of said aluminum hydroxide being 0.5–5 percent of the weight of the pigment calculated as $Al_2O_3$ and effecting the thermal drying and the grinding at such a low temperature that the pigment temperature is between 105°C and 300°C and for such a short period that the vanadium hydroxide remains on the surface of the titanium dioxide pigment particles without being calcinated into the particles.

2. The process of claim 1, wherein the washed filtrate is steam ground by means of super-heated steam the temperature of which is about 250°–300°C.

3. The process of claim 1, further comprising adding to the suspension of the titanium dioxide pigment a compound selected from at least one of a phosphate or a silicate.

4. The process of claim 3, wherein a silicate in a quantity of 0.2–3 percent, calculated as $SiO_2$, and a phosphate in a quantity 0.1–2 percent, calculated as $P_2O_5$, the quantities being in percent of the pigment weight have been precipitated onto the surface of the pigment particles in addition to said vanadium hydroxide and said aluminum hydroxide.

5. The process according to claim 2 wherein the temperature is about 270°C.

6. The process according to claim 1, wherein the quantity of said vanadium compound is 0.05–0.2 percent of the pigment weight, calculated as $V_2O_5$.

7. The process according to claim 1 wherein the quantity of said aluminum compound is 1–3 percent calculated as $Al_2O_3$ of the pigment weight.

8. The process according to claim 4 wherein the quantity of silica is 0.5–1.5 percent.

9. The process according to claim 1 wherein the temperature during the thermal drying and grinding is about 17 hours at 105°C.

10. The process according to claim 1 wherein the temperature during the thermal drying and grinding is about 150°–170°C. for 0.5–2 hours.

* * * * *